July 6, 1937.     R. J. PRESTON     2,086,046
INSECT DESTROYING MEANS
Filed April 19, 1933
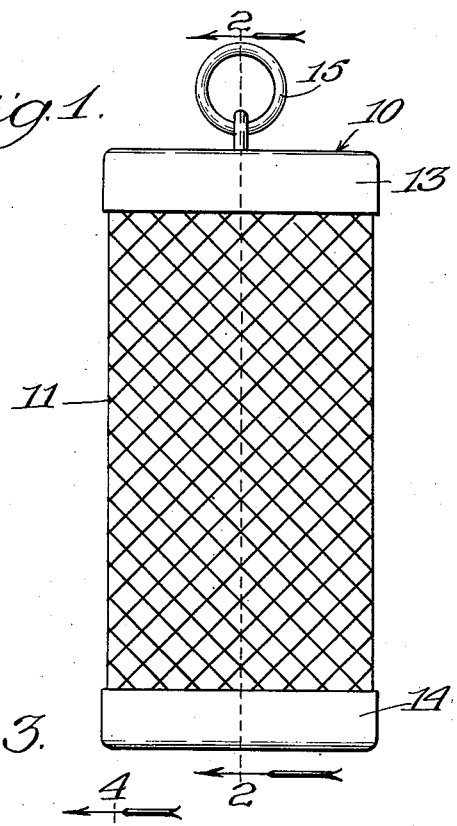
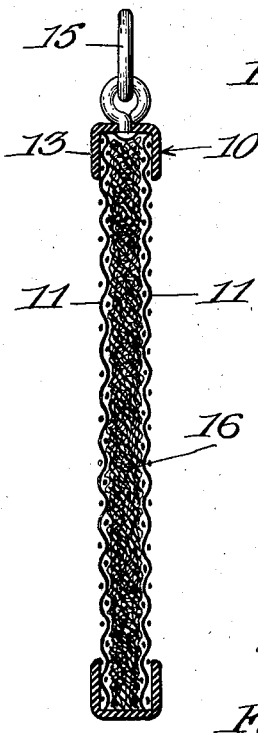
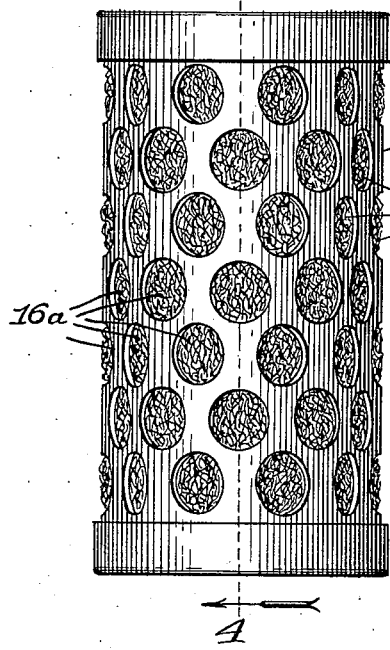
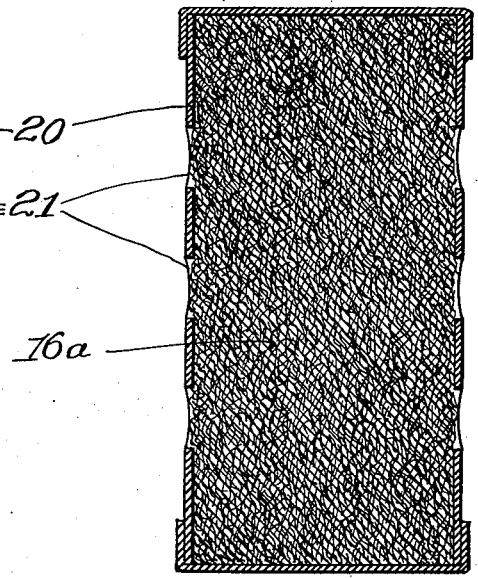
Inventor:
Ross J. Preston,
By Dyrenforth, Lee, Chritton & Wiles
Attys.

Patented July 6, 1937

2,086,046

UNITED STATES PATENT OFFICE 2,086,046

INSECT DESTROYING MEANS

Ross J. Preston, Chicago, Ill., assignor, by direct and mesne assignments, of one-third to Harry R. Schlau and one-third to H. A. Barnhardt, both of Chicago, Ill., and one-third to Arthur W. Carlson, Glenview, Ill.

Application April 19, 1933, Serial No. 666,897

6 Claims. (Cl. 167—48)

The invention relates to a method of and means for destroying insects and the invention is particularly adapted to be embodied in means for destroying the eggs and larvae of clothes moths, such as the case-making clothes moths, the webbing clothes moths and the tapestry moths.

It is the primary object of the invention to provide an improved method of and improved means for attracting clothes moths to poisoned matter suitable as food for the larvae so that the moths will lay their eggs on the poisoned food substance which will devitalize the eggs or destroy the larvae.

A feature of the invention is that when it is practiced, the clothes moths are attracted to the poisoned food substance and are not repelled so that they will leave the substance and lay their eggs on clothing, etc., which has not been treated by practicing the improved method. The primary advantage of attracting the moths to the poisoned food substance is readily apparent. If clothes, etc. were simply treated with a substance poisonous to the larvae, the moths would not necessarily select the treated clothes to hold the eggs. If other untreated clothes, etc., were in close proximity to the treated clothes, the moths would select one or the other without any discrimination. However, when the moths are attracted to suitably prepared food substances they will not place their eggs on clothing, etc. which happens to be in the same room with the food substance.

Other objects and advantages will become apparent as the following detailed description progresses, reference being had to the accompanying drawing, wherein—

In the drawing, Fig. 1 is a front view of a device which embodies the invention.

Fig. 2 is a section taken on line 2—2 of Fig. 1.

Fig. 3 is a device which embodies another form of the invention, and

Fig. 4 is a section taken on line 4—4 of Fig. 3.

Referring for the present to Figs. 1 and 2 of the drawing, wherein a preferred embodiment of the invention is illustrated, the reference character 10 designates generally a bag which is formed of a coarse mesh 11 of twine or wire, the mesh 11 being folded to form a tube which has its ends closed by U-shaped strips 13 and 14 of fabric or sheet metal. Secured to the strip 13 is an eye 15 whereby the bag 10 may be suspended from a nail or hook. The bag 10 is filled with wool, felt, matted wool, hair or any other substance upon which the larvae of clothes moths will feed. In the preferred embodiment of the invention, the filling for the bag 10, which filling is designated by the reference character 16, comprises wool or hair which has not been subjected to any treatment which would remove the natural oils therefrom. The filling 16 is impregnated preferably with a hygroscopic agent which will tend to keep the filling in a relatively soft condition. Sodium chloride may be employed as the hygroscopic agent but the invention is not limited to this particular substance as in some instances glycerine or other hygroscopic agents may be used for this purpose.

The filling 16 is also impregnated with a compound which will devitalize or sterilize the eggs of clothes moths or will destroy the larvae thereof when hatched. Various arsenical compounds may be employed for this purpose. Arsenic trioxide is preferred as far as the arsenical compounds are concerned. Compounds other than arsenical compounds may also be employed. Thus, it is contemplated that barium chloride and cobalt chloride will be employed in some instances.

The filling 16 is also treated with fats or oils preferably of an animal origin although in some instances, vegetable oils may be employed. The fats or oils will attract the female clothes moths and cause them to deposit their eggs on the filling 16 through the openings in the mesh 11.

It has been found in practice that the female clothes moths will select the filling 16 as food for the larvae rather than clothes, etc. which have been dyed or subjected to other processes that tend to remove the natural oil from the material from which the clothes, etc. are made. Therefore, if one or more bags 10 are placed in a clothes closet in which clothes, etc. are stored, the moths will be attracted to the poisoned food substance 16 and will not deposit their eggs upon the clothes, etc. stored in the closet.

In Figs. 3 and 4 another embodiment of the invention is illustrated. This embodiment comprises a can 20 preferably formed from sheet metal or cardboard and provided with numerous relatively large openings 21 through which a filling 16a is accessible to the female moths. The filling 16a is formed from the same substances as the filling 16 described above. Obviously, the can 20 may be placed upon a shelf or in a drawer or chest to protect adjacent garments, etc.

It is also contemplated that rags, felt strips, matted hair, pads or any other suitable food for clothes moths may be treated as described above to attract clothes moths and to destroy the eggs and larvae thereof.

While I have shown and described certain embodiments of my invention, it is to be understood that it is capable of many modifications. Changes, therefore in the construction and arrangement may be made without departing from the spirit and scope of the invention as disclosed in the appended claims, in which it is my intention to claim all novelty inherent in my invention as broadly as possible, in view of the prior art.

I claim:

1. An article of manufacture for protecting clothes and the like against moths and similar egg-laying insects which comprises a perforated container containing a body of fibrous material constituting natural food for the insect larvae impregnated with an oleaginous substance serving to attract the egg-laying insects and with a larvicide.

2. An article of manufacture for protecting clothes and the like against moths and similar egg-laying insects which comprises a foraminous casing enclosing a pad of fibrous material constituting natural food for the larvae of the insect impregnated with a material selected from the class consisting of oils and fats serving to attract the egg-laying insects and with a poisonous reagent serving to divitalize the eggs and to kill the insect larvae when hatched.

3. As an article of manufacture, a lure for moths and similar egg-laying insects comprising a moth larvae food containing an oleaginous lure for moths or like insects and a larvicide.

4. As an article of manufacture, a lure for moths and similar egg-laying insects comprising a fibrous moth larvae food, an oleaginous lure for moths or like insects and barium chloride.

5. As an article of manufacture, a lure for moths and similar egg-laying insects comprising a fibrous moth larvae food, an oleaginous lure for moths or like insects and cobalt chloride.

6. As an article of manufacture, a lure for moths and similar egg-laying insects comprising a fibrous moth larvae food, an oleaginous lure for moths or like insects and an arsenical compound.

ROSS J. PRESTON.